United States Patent [19]
Weldy

[11] Patent Number: 5,297,219
[45] Date of Patent: Mar. 22, 1994

[54] TRANSFORMS FOR DIGITAL IMAGES IN A HIERARCHICAL ENVIRONMENT

[75] Inventor: John A. Weldy, Rochester, N.Y.

[73] Assignee: Eastman Kodak Company, Rochester, N.Y.

[21] Appl. No.: 722,419

[22] Filed: Jun. 27, 1991

[51] Int. Cl.$^5$ .......................... G06K 9/36; G06K 9/40; G06K 9/46; G06K 9/03

[52] U.S. Cl. ........................................ 382/54; 382/56; 382/57

[58] Field of Search ................. 382/41, 47, 54, 56, 382/57; 358/403, 445; G06K 9/40, 9/36, 9/46, 9/03, 9/42

[56] References Cited

U.S. PATENT DOCUMENTS

| | | | |
|---|---|---|---|
| 4,969,204 | 11/1990 | Melnychuck et al. | 382/56 |
| 4,972,497 | 11/1990 | Saito et al. | 382/56 |
| 4,979,229 | 12/1990 | Moolenaar | 382/47 |
| 5,029,228 | 7/1991 | Nonoyama et al. | 382/56 |
| 5,058,185 | 10/1991 | Morris et al. | 382/57 |

Primary Examiner—Jose L. Couso
Attorney, Agent, or Firm—Edward Dugas

[57] ABSTRACT

An improved method and associated mechanism for facilitating the transformation of digitized images intended for use in a multi-resolution, multi-application environment by performing complex transformations on low resolution image components and approximate transformations on the high level image components so as to reduce computational complexity. In a preferred embodiment of the invention, the transformation operator is executed upon a relatively low spatial resolution file, thereby resulting in a substantial reduction in processing overhead. Advantage is thus taken of the availability of the reduced size of the lower spatial resolution base file within the hierarchical database, so that a relatively complex conversion may be performed on a small number of pixels within the base file, prior to up-converting the image to a relatively high spatial resolution image, such as a 2048×3072 pixel image for driving a high resolution digital thermal color printer.

11 Claims, 5 Drawing Sheets

TRANSFORMS FOR DIGITAL IMAGES IN A HIERARCHICAL ENVIRONMENT

FIELD OF THE INVENTION

The present invention relates in general to digital image processing systems and more particularly is directed to a method and associated mechanism for facilitating the transformation of digitized images that are intended for use in a multi-resolution, multi-application environment.

BACKGROUND OF THE INVENTION

Recent improvements in their spatial and data resolution capability have made digital image processing systems particularly attractive for multi-use environments, in which the user has the option of selecting the type of reproduction device and the desired resolution of the reproduction device. In still color image photography, for example, when an image, that has been captured on color photographic film or a high spatial resolution color digital camera, is digitized and stored in an attendant data base, it can be readily optimized for reproduction on a variety of output devices (e.g. a color video display or a digitally driven, high resolution color thermal printer) through the use of workstation-resident image processing software. In the case of a constant reproduction device, it may be desirable to uniquely modify portions of an image or the total image for desired reproduction in manner that is different than the manner used for other images.

One example of a digitized image processing system that takes advantage of this capability is the color photo-finishing system described in co-pending patent application Ser. No. 582,305, filed Sep. 14, 1990, by S. Kristy entitled "Multi-Resolution Digital Imagery Photofinishing System," assigned to the assignee of the present application and the disclosure of which is herein incorporated. As explained in that application, conventional photo-finishing of consumer-generated still color photographs (e.g. those captured on 35mm color film) customarily involves the use of an analog electro-optic system and an associated chemical-based print developing unit. The Kristy application describes a digital image-based photofinishing apparatus that enables the user to personally customize and obtain high quality prints of photographic images. It also provides for the storage and retrieval of high spatial resolution digitized color still images for playback to a variety of reproduction devices, the spatial resolution of which may vary.

FIG. 1 diagrammatically illustrates such an improved photofinishing apparatus as employing a high spatial resolution film scanner 32 that is used to scan an image, for example, from film strip 36. The high spatial resolution scanner 32 has built therein means for converting the scanned image into corresponding digital signals representing a pixel array that may be processed in various ways by a host computer 34. The term high spatial resolution, as applied to a pixel array from a scanner, means, a pixel array of a size and a population that is sufficient to provide a color print having a quality equal to that normally provided by analog optical systems. The host computer 34 is interfaced to monitor 39 and associated keyboard (not shown) for permitting an operator to interface with the control functions and operating programs of the host computer. The output images from the host computer 34 can be directed to a high resolution printer 38 and/or to a TV display 37. The TV display 37, with present technology, would not be able to display as finely a detailed image as is obtained on a photographic print.

The digital image signals supplied to the host computer 34 are in the form of an imaging pixel array-representative bit map, resolved to a prescribed digital code width (e.g. eight bits per color per pixel). Host computer 34 has a resident image-encoding and storage operator through which each high spatial resolution digitized image file may be stored in a multi-resolution, hierarchical format.

One example of a preferred encoding and storage operator that may be used for this purpose is described in U.S. Pat. No. 4,969,204, entitled "A Hybrid Residual-Based Hierarchical Storage and Display Method for High Resolution Digital Images in a Multi-Use Environment," by Paul W. Melnychuck et al, which patent is assigned to the assignee of the present application and the disclosure of which is herein incorporated.

To optimize the performance of aforementioned reproduction systems in different conditions it is often necessary that modifications be made in the transform. The modification may involve anything from a single-channel independent modification to the use of a series of multi-channel color space transformations. Although a low level transform modification may not require a significant amount of additional image processing, executing a more intense transform modification in a very high spatial resolution application, such as would be needed for a 2040×3072 pixel array printer, can be particularly computationally intense.

Although the system described in U.S. patent application Ser. No. 631,709, affords rapid access to a variety of image formats and allows the user to select the reproduction medium and spatial resolution at which the accessed image is reproduced, there still remains the problem of transforming the digitized image file in the event that a change in metric, for example, a change in color metric to accommodate a particular display option (device and/or desired color reproduction), is desired.

Based on the above, it would be advantageous to have a simplified method and apparatus for achieving high quality metric conversion (for multiple display options and/or image processing, such as color enhancement options) with less computational burden by capitalizing on the hierarchical structure and the nature of the stored (or starting) metric image that easily allows for simplified transformation of high frequency image information.

SUMMARY OF THE INVENTION

Pursuant to the present invention, rather than take a brute force approach of performing a complex transformation on a relatively high spatial resolution image, such as a 2048×3072 pixel image for a display from a high resolution digital thermal printer, the complex (highly accurate) transformation is executed upon a relatively low resolution image, such as a 512×768 pixel image, and a simple, less accurate transformation is performed on the non-redundant hierarchically encoded high resolution image information, such as the images formed in the hierarchical encoding scheme referenced in the Patent Application above.

More specifically, in the method of processing a digitized image having a low resolution image component and at least one high resolution image component through a selected transformation to form a transformed high resolution digitized image there is provided the steps of:

(a) transforming the low resolution image component by a first transformation to form a first transformed low resolution image component;

(b) predicting a high resolution image component from the first transformed low resolution image component;

(c) transforming the at least one high resolution image component by a second transformation to form a transformed high resolution image component; and (d) combining the predicted high resolution image component with the transformed high resolution image component to provide the transformed high resolution digitized image.

From the above it can be seen that it is a primary object of the present invention to provide an improved method and associated mechanism for the processing of digitized images having a low resolution image component and at least one high resolution image component, through a selected transformation, to enable the combined image components to interface with a variety of display and/or printer devices.

It is another object of the present invention to provide a method and associated mechanism for processing a digitized image in a multi-use environment in which the user has the option of selecting the type of reproduction, the type of reproduction device, and the desired resolution of the reproduction device.

It is yet another object of the present invention to provide a method and associated mechanism for achieving a high quality image transformation with less computational burden.

These and other objects of the present invention will become more apparent when taken in conjunction with the following description and drawings wherein like characters indicate like parts and which drawings form a part of the description.

DESCRIPTION OF THE PREFERRED EMBODIMENT

Figure 1:
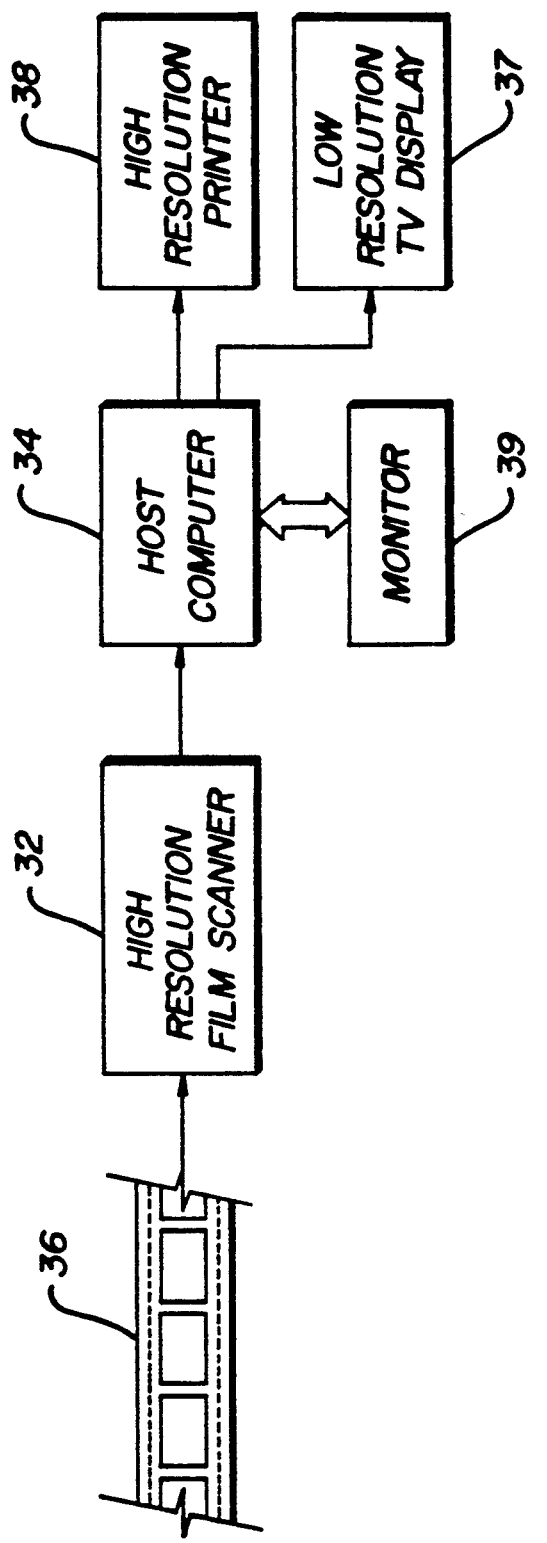
FIG. 1 diagrammatically illustrates a digital image-based photofinishing apparatus having multi-resolution, multi-use capability that provides for the storage and retrieval of high spatial resolution digitized color still images for playback to a variety of reproduction devices, the spatial resolution of which may vary.

Before describing in detail the particular improved digital image transformation method and mechanism in accordance with the present invention, it should be observed that the present invention resides primarily in a novel method and structural combination of conventional digital imagery processing modules (digital image conversion/transformation operators) and not in the details thereof. Accordingly, the format, control and linking of these modules have been illustrated in the drawings by readily understandable block diagrams which show only those specific details that are pertinent to the present invention, so as not to obscure the disclosure with details which will be readily apparent to those skilled in the art having the benefit of the description herein. Thus, the block diagram illustrations are primarily intended to illustrate the major components of the mechanism in a convenient functional grouping, whereby the present invention may be more readily understood.

It should also be noted that the term transform, as employed in the present description, is used in a non-limiting sense and is not directed to any specific type of image parameter or to a specific set of parameters. Consequently, a transformation may include something as simple as a single channel level shift to a series of multi-channel color space transformations. Also, the transform operator is not limited to a specific type of module or given set of parameters upon which the module operates. For example, in the case of a multiple (e.g. three) channel color space transformation, color translation matrices and associated look-up tables may be executed in cascade. Exemplary color space transformation operators include a primary conversion matrix for converting from one primary color system to another, such as that described on page 217, for example, of "THE TELEVISION ENGINEERING", K. Blair Benson, Editor in Chief, Published by McGraw-Hill, 1986. Thus, in the following description of the preferred embodiments of the invention, it is to be understood that these or other functionally equivalent transformation modules may be employed.

Figure 2:
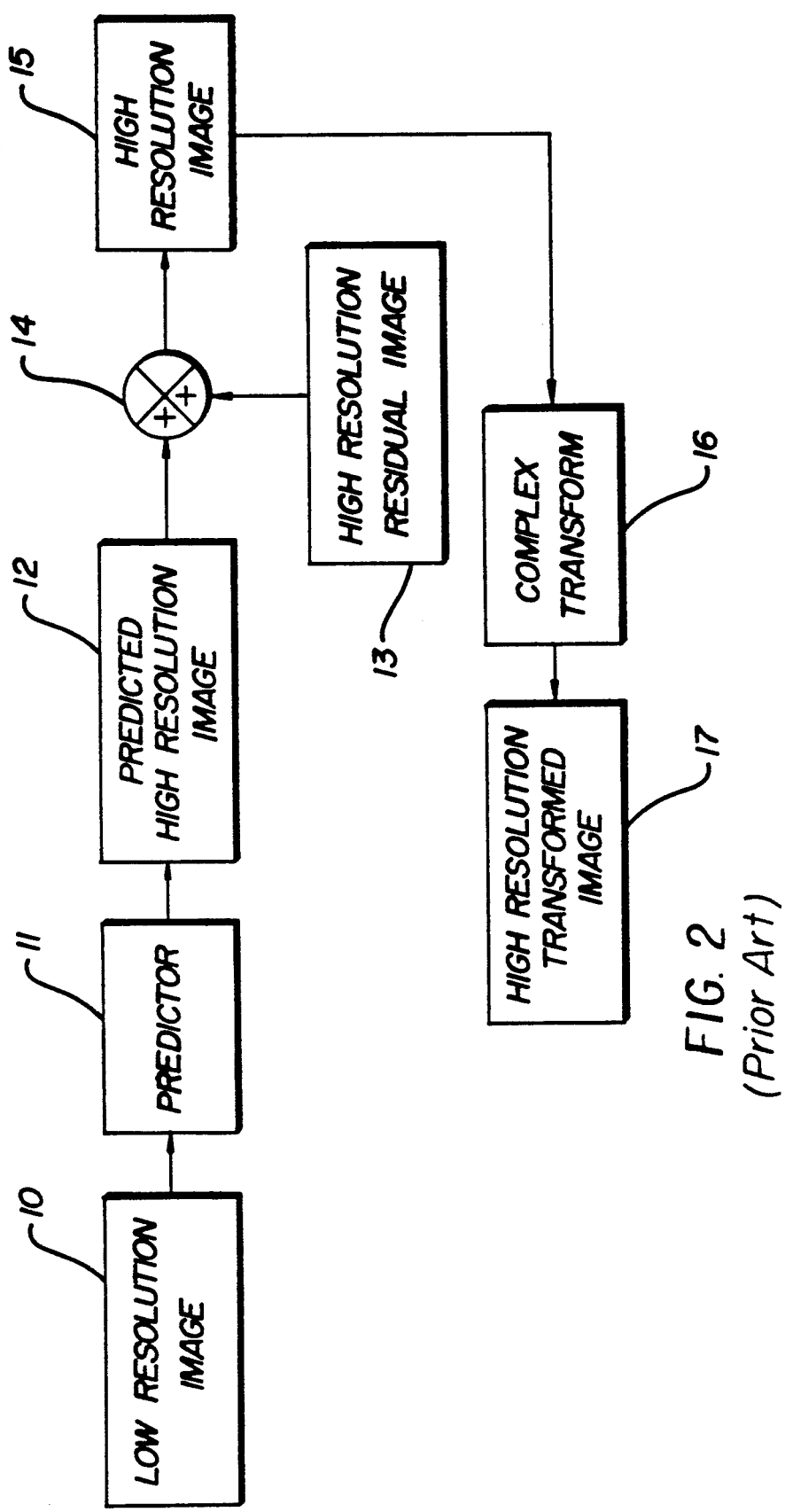
FIG. 2, illustrates, in block diagram form, a PRIOR ART method and mechanism for performing a transformation of a digital image in hierarchical format to match the resolution of the reproduction device.

Referring to the PRIOR ART block diagram illustrated in FIG. 2, a predicted relatively high spatial resolution, image component 12, is formed by applying a prediction process 11, to a relatively low spatial resolution, image component 10 (formed and stored during an image decomposition process), which was stored as part of an image decomposition method. A relatively high spatial resolution, residual image component 13 (formed and stored during the image decomposition process), is combined with the predicted image component 12, in the summer 14, to fully reconstruct a relatively high spatial resolution, image 15. Every pixel in the high spatial resolution, image 15 must then pass through a potentially complex transformation 16, in order to produce the relatively high spatial resolution, transformed, image 17.

Figure 3:
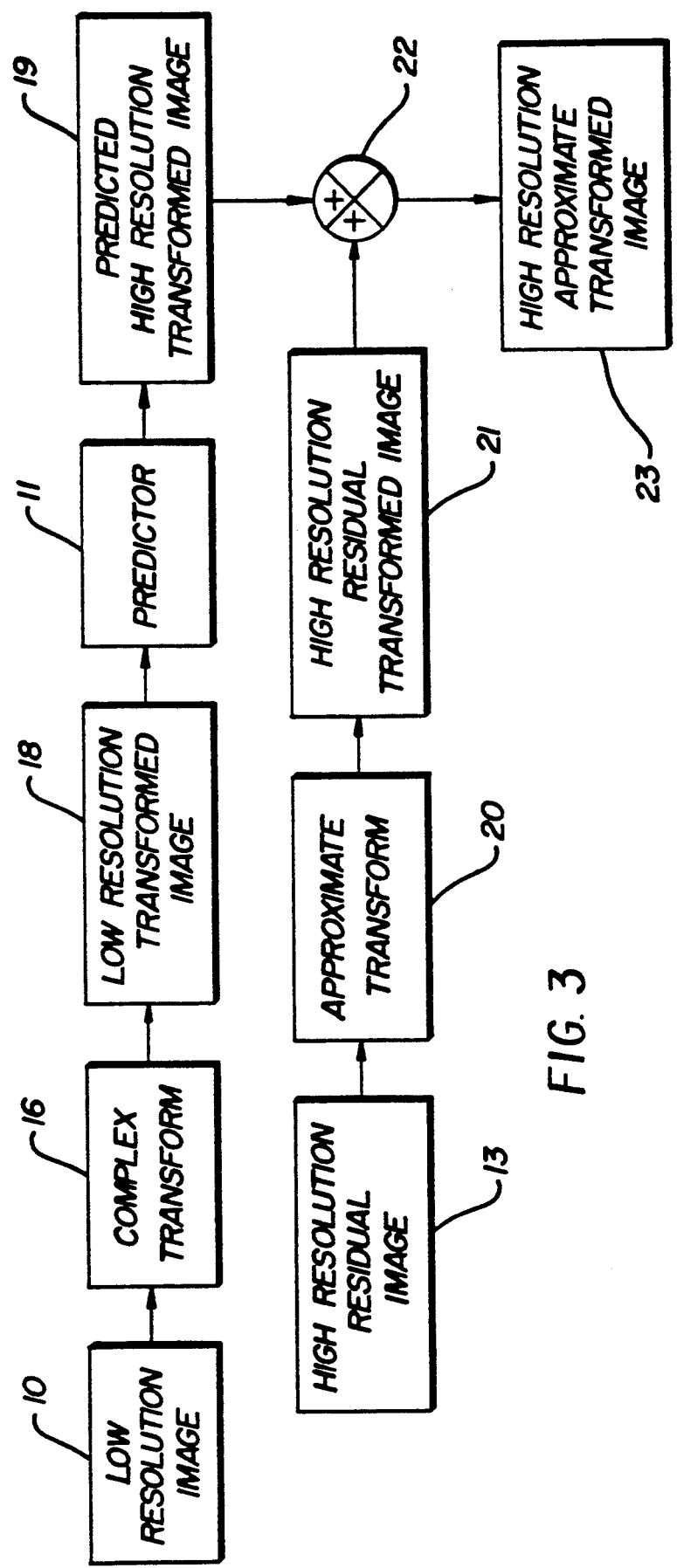
FIG. 3, illustrates, in block diagram form, a preferred embodiment of the present invention.

Referring to the preferred embodiment of the invention illustrated in FIG. 3, the relatively low resolution, image 10 (formed and stored during the image decomposition process), is passed through the complex (accurate) transform 16, to create a relatively low resolution, transformed image component 18. A predicted relatively high resolution, transformed image component 19, is formed by applying a prediction process 11, to the relatively low resolution, transformed, image component 18. A high resolution residual image component 13 is passed through a simplified, less computationally involved transform 20, (which approximates the transform 16 as best as possible depending on different error criteria, such as least squares minimization) to produce a high resolution residual, transformed residual image component 21. The transformed residual image component 21, is combined with the transformed predicted image component 19 in the summer 22, to form a relatively high spatial resolution, transformed, (digitized) image 23.

Figure 4:
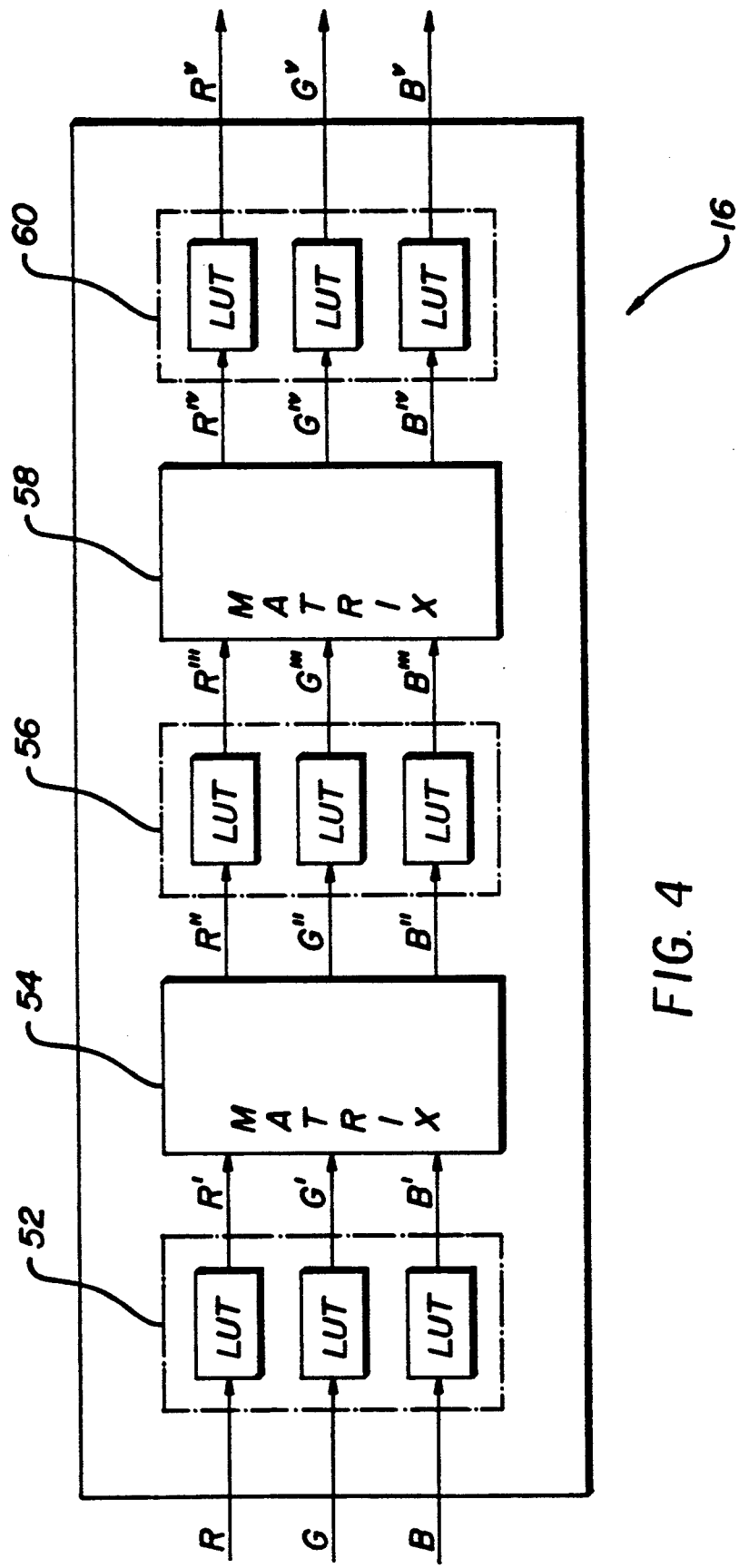
FIG. 4, illustrates, in a detailed block diagram form, one example of a complex transform.

In FIG. 4 there is shown the details of one complex transform 16. Dependent upon the particular transformation desired other configurations of the transform may be used. In the application where the digital image is configured into three color channels denoted R, G, and B, the input signals are first applied to independent one dimensional look-up tables 52. The look-up tables function to generate linear signals denoted R', G', and B', for primary conversion in a matrix 54. The matrix 54 converts the input signals from a stored format to a primary display format. The output signals R", G", and B", are directed to another set of channel independent look-up tables 56 that convert the input signals from a linear to a non-linear format. The matrix 58 provides a color correction enhancement function to the signals and the channel independent look-up tables 60 condition, for example, the tone characteristics of the signals according to the selected display or hard copy reproduction device. In the aforementioned variation the look-up tables are one dimensional. It may also be desirable in certain situations to use 3-D look-up tables to perform part or all of the process (method).

Figure 5:
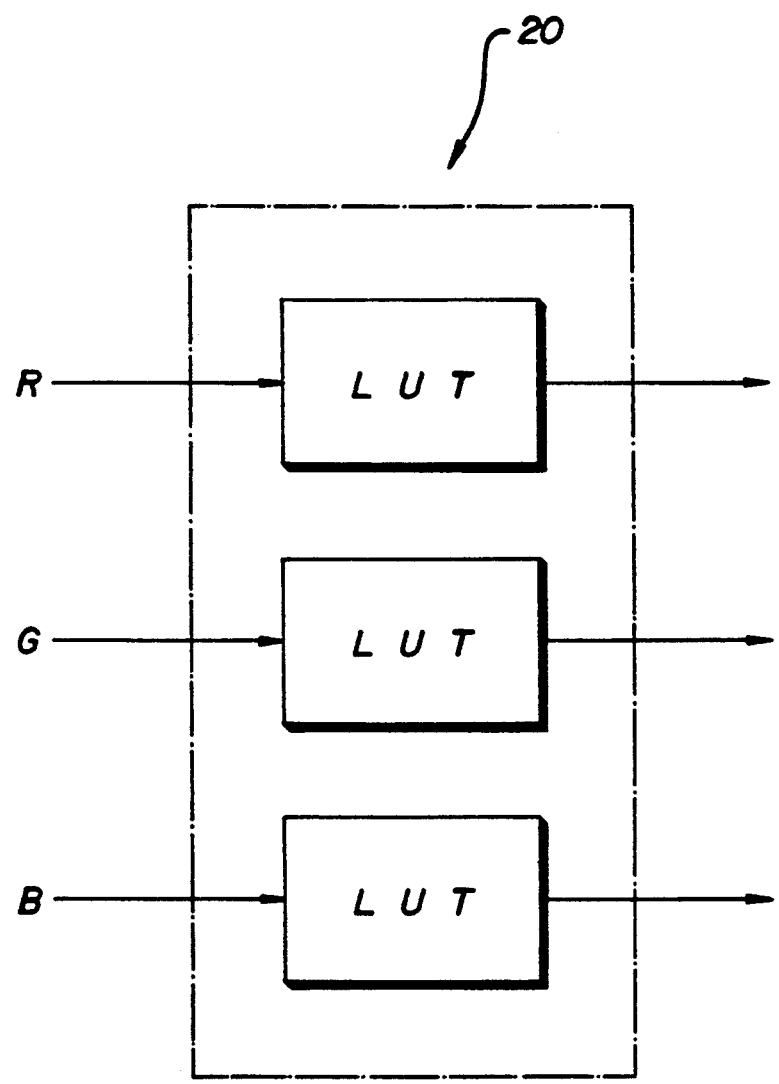
FIG. 5, illustrates, in a detailed block diagram form, one example of an approximate transform.

FIG. 5 illustrates in more detail the approximate transform 20 which is shown formed of three channel independent look-up tables each of which is programmed with a close approximation of the more complex and accurate transform that is contained in the complex transform 16.

In summary the present invention, rather than taking a brute force approach to performing complex transformations on a relatively high spatial resolution image for display from a variety of high resolution display and or printer devices, performs the complex transformation on non-redundant hierarchically encoded low resolution image information which is then combined with a high resolution residual image component to form the transformed high resolution digitized image. More specifically, in the preferred embodiment, a transform, requiring a series of multi-channel color space transformations, is performed on the hierarchically encoded low resolution image information. This particular embodiment reduces the number of pixels to be processed through a complex, multi-channel, computational path. The single-channel independent modification to the residual information represents no additional computational complexity since these files are typically aggressively quantized and entropy encoded for compression advantage. Any single-channel independent modification can be cascaded, without any increase in computational load.

While there has been shown what is considered to be the preferred embodiments of the invention, it will be manifest that many changes and modifications may be made therein without departing from the essential spirit of the invention. It is intended, therefore, in the annexed claims, to cover all such changes and modifications that may fall within the true scope of the invention.

What is claimed is:

1. A method of processing a digitized image having a low resolution image component and at least one high resolution image component through a selected transformation to form a transformed high resolution digitized image comprising the steps of:
    (a) transforming said low resolution image component by a first transformation to form a first transformed low resolution image component;
    (b) predicting a high resolution image component from the first transformed low resolution image component;
    (c) transforming said at least one high resolution image component by a second transformation to form a transformed high resolution image component; and
    (d) combining said predicted high resolution image component with said transformed high resolution image component to provide a transformed high resolution digitized image.

2. The method according to claim 1 wherein the first transformation is more complex than said second transformation.

3. The method according to claim 1 wherein said second transformation is an approximate transformation.

4. The method according to claim 1 wherein said digitized image is a multi-channel image.

5. The method according to claim 4 wherein the low resolution image component of said multi-channel image is transformed by processing the image through:
    (a) a first set of channel independent look-up tables;
    (b) a first channel interdependent matrix;
    (c) a second set of channel independent look-up tables;
    (d) a second channel interdependent matrix; and
    (e) a third set of channel independent look-up tables.

6. The method according to claim 5 wherein the high resolution image component of said multi-channel image is transformed by processing the image through:
    (a) a set of channel independent look-up tables.

7. A mechanism for processing a digitized image having a low resolution image component and at least one high resolution image component through a selected transformation to form a transformed high resolution digitized image comprising:
    means for providing a low resolution image component;
    first transforming means for transforming said low resolution image component to form a transformed low resolution image component;
    predicting means connected to the output of said first transforming means for providing a transformed predicted high resolution image component from said transformed low resolution image component;
    means for providing a high resolution image component;
    second transforming means for transforming said at least one high resolution image component by a second transformation to form a transformed high resolution image component; and
    summing means for combining said transformed predicted high resolution image component with said transformed high resolution image component to provide a transformed high resolution digitized image.

8. The mechanism according to claim 7 wherein said first transforming means performs a more complex transformation than said second transforming means.

9. The mechanism according to claim 7 wherein said second transforming means provides an approximate transformation.

10. The mechanism according to claim 7 wherein said first transforming means is comprised of:
    a first set of channel independent look-up tables for receiving said low resolution image component;

a first channel interdependent matrix connected to the output of said first set of channel independent look-up tables;

a second set of channel independent look-up tables connected to the output of said first channel interdependent matrix;

a second channel interdependent matrix connected to the output of said second set of look-up tables; and a third set of channel independent look-up tables connected to said second channel independent matrix.

11. The mechanism according to claim 7 wherein said second transforming means is formed as a set of channel independent look-up tables.

* * * * *